(12) United States Patent
D'Amico

(10) Patent No.: US 10,993,386 B1
(45) Date of Patent: May 4, 2021

(54) SYSTEM AND METHOD FOR COMMERCIALLY GROWING MUSHROOMS

(71) Applicant: John D'Amico, Avondale, PA (US)

(72) Inventor: John D'Amico, Avondale, PA (US)

( * ) Notice: Subject to any disclaimer, the term of this patent is extended or adjusted under 35 U.S.C. 154(b) by 0 days.

(21) Appl. No.: 16/751,985

(22) Filed: Jan. 24, 2020

Related U.S. Application Data

(60) Provisional application No. 62/796,900, filed on Jan. 25, 2019.

(51) Int. Cl.
*A01G 18/00* (2018.01)
*A01G 18/70* (2018.01)
*A01G 18/62* (2018.01)
*A01G 18/20* (2018.01)
*A01G 18/61* (2018.01)

(52) U.S. Cl.
CPC .............. *A01G 18/70* (2018.02); *A01G 18/00* (2018.02); *A01G 18/20* (2018.02); *A01G 18/61* (2018.02); *A01G 18/62* (2018.02)

(58) Field of Classification Search
CPC ........ A01G 18/00; A01G 18/20; A01G 18/22; A01G 18/60; A01G 18/61; A01G 18/62; A01G 18/66; A01G 18/70
USPC .......................................................... 47/1.1
See application file for complete search history.

(56) References Cited

U.S. PATENT DOCUMENTS

| | | | | |
|---|---|---|---|---|
| 1,694,482 A * | 12/1928 | Morris | ................... | A01G 18/60 47/1.1 |
| 4,443,969 A * | 4/1984 | Hanacek | ................ | A01G 18/00 47/1.1 |
| 4,722,159 A * | 2/1988 | Watanabe | .............. | A01G 18/00 47/1.1 |
| 4,833,820 A * | 5/1989 | Nishio | .................. | A01G 18/00 47/1.1 |
| 6,018,906 A * | 2/2000 | Pia | ........................ | A01G 18/60 47/1.1 |
| 6,061,951 A * | 5/2000 | Pia | ........................ | A01G 18/00 47/1.1 |
| 7,501,360 B2 * | 3/2009 | Heezen | .................. | A01G 18/00 442/185 |
| 8,069,608 B1 * | 12/2011 | Pannell | .................. | A01G 18/20 47/1.1 |
| 8,869,691 B1 * | 10/2014 | Pannell | ..................... | B30B 1/34 100/226 |
| 10,004,182 B1 * | 6/2018 | Pannell | .................. | A01G 18/00 |
| 2003/0121201 A1 * | 7/2003 | Dahlberg | ................ | C05F 11/00 47/1.1 |
| 2007/0101642 A1 * | 5/2007 | Fang | ..................... | A01G 18/00 47/1.1 |
| 2007/0111623 A1 * | 5/2007 | Heezen | .................. | A01G 18/00 442/181 |

(Continued)

*Primary Examiner* — Monica L Barlow
*Assistant Examiner* — Michael A. Fabula
(74) *Attorney, Agent, or Firm* — Joseph E. Maenner; Petock & Petock LLC

(57) ABSTRACT

A method for commercially growing mushrooms includes the steps of: placing a layer of compost in a bed; laying a polymer sheet over the layer of compost; placing a layer of peat over the sheet; growing a crop of mushrooms in the first layer of peat; harvesting the crop of mushrooms; removing the polymer sheet and the layer of peat from the sheet; placing a replacement polymer sheet and layer of peat over the sheet; and growing a replacement crop of mushrooms. Mushrooms grown according to the method are also disclosed.

11 Claims, 3 Drawing Sheets

(56) References Cited

U.S. PATENT DOCUMENTS

| | | | |
|---|---|---|---|
| 2009/0025286 A1* | 1/2009 | Kawai | A01G 18/10 47/1.1 |
| 2009/0148926 A1* | 6/2009 | Kawai | C12N 1/14 435/256.8 |
| 2010/0139157 A1* | 6/2010 | Kawai | A01G 18/00 47/1.1 |
| 2011/0239533 A1* | 10/2011 | Leone | A01G 18/00 47/1.1 |
| 2020/0120880 A1* | 4/2020 | Ross | A01G 18/10 |

* cited by examiner

SYSTEM AND METHOD FOR COMMERCIALLY GROWING MUSHROOMS

BACKGROUND OF THE INVENTION

Field of the Invention

The present invention relates to a system and method for commercially growing mushrooms

Description of the Related Art

Mushrooms are commercially grown in environmentally controlled houses using a layer of peat laid over a layer of compost. Typically, after a full mushroom crop is harvested, the entirety of the peat and compost is removed and a new layer of peat and compost have to be laid down. This process can be time consuming and expensive.

It would be beneficial to develop a method for growing mushrooms that does not require the compost to be removed after each crop of mushrooms is harvested.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a method for commercially growing mushrooms comprising the steps of: placing a layer of compost in a bed; laying a polymer sheet over the layer of compost; placing a layer of peat over the sheet; growing a crop of mushrooms in the first layer of peat; harvesting the crop of mushrooms; removing the polymer sheet and the layer of peat from the sheet; placing a replacement polymer sheet and layer of peat over the sheet; and growing a replacement crop of mushrooms.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION

Figure 1:
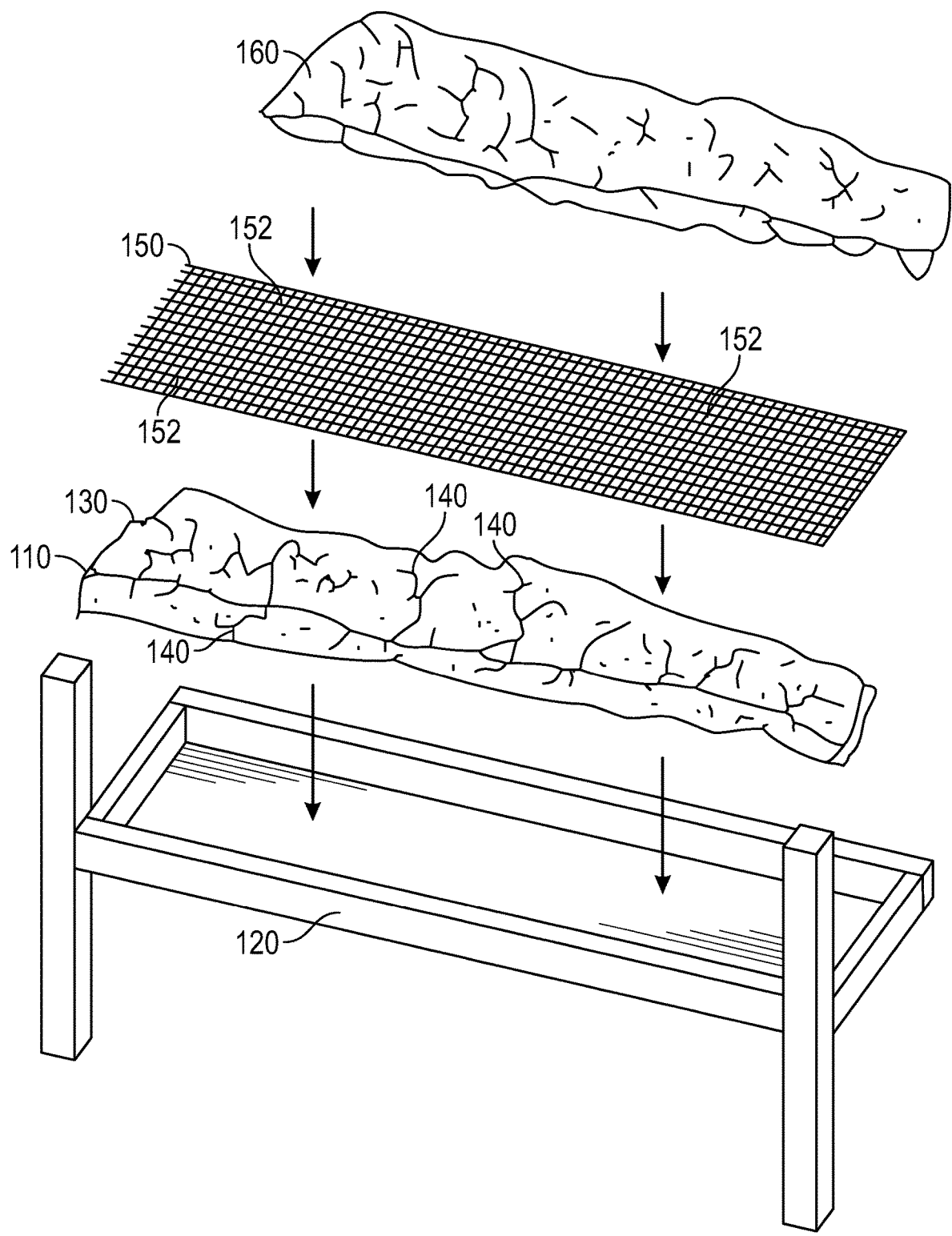
FIG. 1 is an exploded perspective view of an arrangement of a mushroom growing bed according to an exemplary embodiment of the present invention.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

The present invention provides a method of commercially growing mushrooms. The method uses a perforated polymer sheet between a base compost layer and a top peat layer so that, after a determined number of mushroom breaks has been harvested, instead of removing all of the compost from the mushroom bed, only the polymer sheet and the peat layer are removed and replaced for a second crop of mushrooms, thereby reducing the turnaround time between crops as well as the cost of compost for the second crop, due to the compost remaining in the bed between crops. In an exemplary embodiment, the second crop supports less breaks than the first crop. For example, the first crop might yields three breaks, the second crop might only yield two breaks.

Initially, composting can be generated according to any of known composting methods. Composting can last between about 7 and about 14 days, depending on the nature of the material used for forming the compost. A strong ammonia odor is associated with composting, which is usually complemented by a sweet, moldy smell. When compost temperatures are 155° F. and higher, and ammonia is present, chemical changes occur that result in a food rather exclusively used by the mushrooms. As a by-product of the chemical changes, heat is released and the compost temperatures increase. Temperatures in the compost can reach 170° to 180° F. during the second and third turnings when a desirable level of biological and chemical activity is occurring.

After the compost is formed, pasteurization is necessary to kill any insects, nematodes, pest fungi, or other pests that may be present in the compost. Also, it is necessary to remove the ammonia which formed during the composting process.

Figure 2:
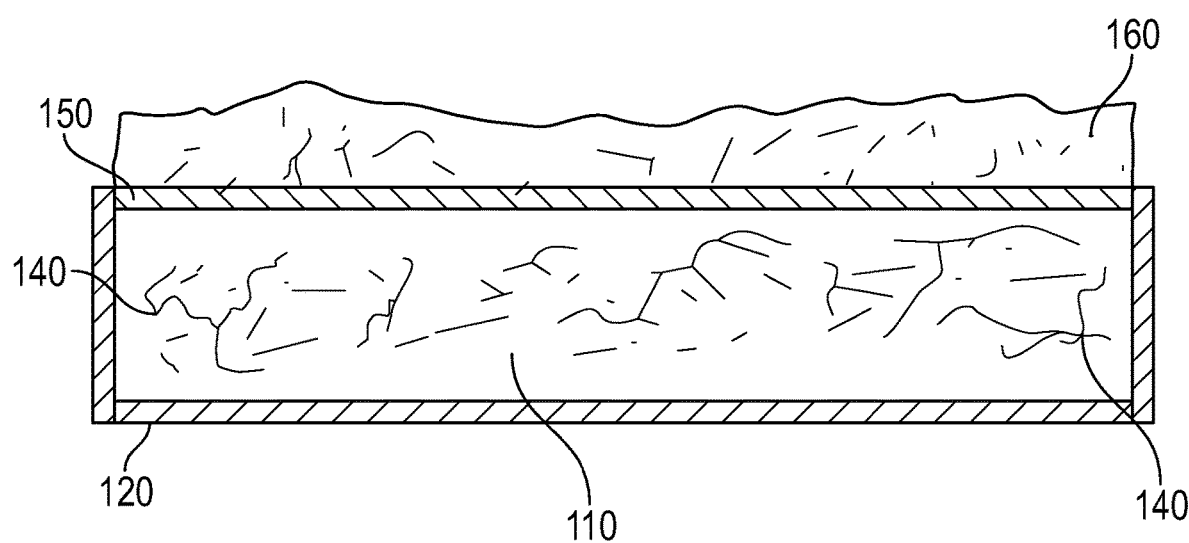
FIG. 2 is a side elevational view, in section of the mushroom growing bed of FIG. 1.

Next, referring to FIGS. 1 and 2, the compost 110 is moved to an environmentally controlled growing room, where the compost 110 is placed directly in growing beds 120, which can be stacked six to eight high. The compost 110 should be filled uniformly in depth and density or compression. In an exemplary embodiment, the compost 110 can be laid about 0.8 inches on top of bed 110. Compost density should allow for gas exchange, since ammonia and carbon dioxide will be replaced by outside air.

Mushroom compost 110 must be inoculated with mushroom spawn 130 if one expects mushrooms to grow. Spawn 130 is distributed on the compost 110 and then thoroughly mixed into the compost 110. This distribution can be performed manually or mechanically, by mixing the spawn 130 into the compost 110 by a special spawning machine (not shown) that mixes the compost 110 and spawn 130 with tines or small finger-like devices.

Once the spawn 130 has been mixed throughout the compost 110 and the compost 110 worked so the surface is level, the compost temperature is maintained at 75° F. and the relative humidity is kept high to minimize drying of the compost surface or the spawn. Under these conditions the spawn 130 will grow—producing a thread-like network of mycelium 140 throughout the compost 110. The mycelium 140 grows in all directions from a spawn grain, and eventually the mycelium 140 from the different spawn grains fuse together, making a spawned bed of compost one biological entity. The spawn 130 appears as a white to blue-white mass throughout the compost 110 after fusion has occurred. As the spawn 130 grows it generates heat, and if the compost temperature increases to above 80° to 85° F., depending on the cultivar, the heat may kill or damage the mycelium 140 and eliminate the possibility of maximum crop productivity and/or mushroom quality. At temperatures below 74° F., spawn growth is slowed and the time interval between spawning and harvesting is extended.

The time needed for spawn 130 to colonize the compost 110 depends on the spawning rate and its distribution, the compost moisture and temperature, and the nature or quality of the compost. A complete spawn run usually requires between about 14 and about 21 days. Once the compost 110 is fully grown with spawn 130, the next step in production begins.

A perforated polymer sheet 150 is laid over the compost 110 in the bed 120. Ideally, the sheet 150 extends in a single sheet that extends at least the length of the bed 120. The sheet 150 includes a plurality of perforations 152 formed therein. The perforations 152 can simply be slits that are cut at intervals along the length and width of sheet 150. Alternatively, the perforations 152 can be cutouts where sheet material has been removed form sheet 150. Still alternatively, sheet 150 can be a woven material with a loose or wide weave such that the perforations 152 are formed between adjacent stands of the weave.

In an exemplary embodiment, sheet 150 is constructed from woven polypropylene yarns, although those skilled in the art will recognize that other materials can be used. The sheet 150 an have a thickness of about 15 mils.

After sheet 150 is laid over the compost 110, a top-dressing is applied on top of sheet 150 on which the mushrooms eventually form. The top dressing can be between about 1½ inches and abut 2 inches thick. A clay-loam field soil, which can be a mixture of peat moss with ground limestone, or reclaimed weathered, spent compost, can be used as the top-dressing, also known as a casing 160. Casing 160 does not need nutrients since casing acts as a water reservoir and a place where rhizomorphs form. Rhizomorphs look like thick strings and form when the very fine mycelium 140 fuses together. Mushroom initials, primordia, or pins, form on the rhizomorphs. Casing 160 can be pasteurized to eliminate any insects and pathogens it may be carrying. Also, it is important that the casing 160 be distributed so the depth is uniform over the sheet 150. Such uniformity allows the spawn 130 to move through the perforations 162 and into and through the casing 160 at the same rate and, ultimately, for mushrooms to develop at the same time. Casing 160 should be able to hold moisture since moisture is essential for the development of a firm mushroom.

The term "break" is given to the repeating harvest periods during each cropping cycle; these are followed by a few days when no mushrooms are available to harvest. This cycle repeats itself in a rhythmic fashion, and harvesting can go on as long as mushrooms continue to mature. Typically, 2-4 breaks can be harvested from a single initial crop cycle.

Mushrooms can be harvested in a 7- to 10-day cycle, but this may be longer or shorter depending on the temperature, humidity, cultivar, and the stage when they are picked. When mature mushrooms are picked, an inhibitor to mushroom development is removed and the next break moves toward maturity.

When the first crop is finished, instead of removing all of the compost 110 and casing 160 and starting completely over with bare beds 120, in the inventive method, the sheet 150 is pulled off with the casing 160 on top of sheet 150, leaving compost 110 in bed 120.

Figure 3:
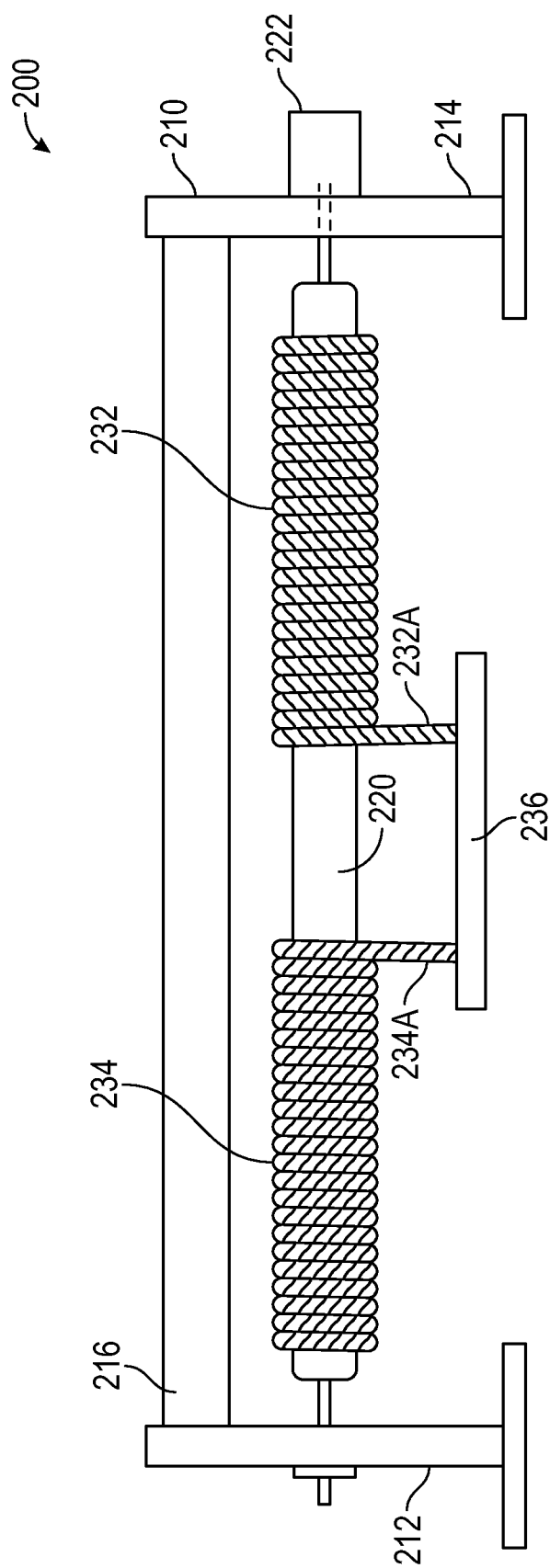
FIG. 3 is a top plan view of an exemplary system for removing a layer on the bed after the mushrooms have been harvested.

FIG. 3 shows an exemplary embodiment of a system 200 used to remove sheet 150 with casing 160 on top of sheet 150. System 200 includes a frame 210 that extends away from an end of a bed 120. Frame 210 includes a pair of parallel legs 212, 214 that are connected by a connecting beam 216. Connecting beam 216 is preferably wider than the width of bed 120.

A spindle 220 can be rotatably mounted on legs 212, 214 and rotated by an electric motor 222. A pair of tug ropes 232, 234 have a first end fixedly connected to spindle 220 and a free end 234A, 234B, respectively, attached to a spacer bar 236. Spacer bar 236 can be releasably attached to an end of sheet 150.

To remove sheet 150 and casing 160 from bed 112, spacer bar 236 is removably attached to sheet 150 and motor 222 is operated to rotate spindle 220 and wind tug ropes 232, 234 onto spindle 220. In the process of winding tug ropes 232, 234 onto spindle 220, tug ropes 232, 234 pull spacer bar 236 and sheet 150 toward spindle 220.

When sheet 150 gets to spindle 220, sheet 150 winds around spindle 220 and casing 160 falls via gravity into a hopper or onto a portable conveyor belt (not shown) for transport away from bed 120.

After the sheet 150 and casing 160 are removed, and without disturbing the compost 110 in bed 120, a second sheet 150 is placed over compost 110. Second sheet 150 can be the same sheet as the original sheet 150 or, alternatively, the second sheet 150 can be a new sheet.

Casing 160 is applied over second sheet 150 as described above and the growing process for the mushrooms is repeated for a second crop. Typically, fewer breaks can be harvested from a second crop than with a first crop, after which time, the compost 110 has yielded a substantial amount of its nutrients and must be replaced.

After the last break of mushrooms in the second crop has been harvested, the sheet 150 and casing 160 are removed from bed 120 as described above. Additionally, the compost 110 is removed from bed 120. The growing room can be closed off and the room pasteurized with steam. This final pasteurization is designed to destroy any pests which may be present in the crop or the woodwork in the growing room, thus minimizing the likelihood of infesting the next crop.

After the room is pasteurized, a new compost 110 can be laid in beds 120 and the process is repeated for two new crops of mushrooms.

It will be further understood that various changes in the details, materials, and arrangements of the parts which have been described and illustrated in order to explain the nature of this invention may be made by those skilled in the art without departing from the scope of the invention as expressed in the following claims.

I claim:

1. A method for commercially growing mushrooms comprising the steps of:
   (a) placing a layer of compost in a bed;
   (b) laying a polymer sheet over the layer of compost;
   (c) placing a layer of peat over the sheet;
   (d) growing a crop of mushrooms in the layer of peat;
   (e) harvesting the crop of mushrooms;
   (f) removing the layer of peat with the polymer sheet by rolling the polymer sheet onto a spindle;
   (g) replacing the original polymer sheet or placing a new polymer sheet and placing a new layer of peat over the original polymer sheet or the new polymer sheet; and
   (h) growing a replacement crop of mushrooms.

2. The method according to claim 1, further comprising the steps of:
   (i) repeating steps (e) and (f); and
   (j) removing the layer of compost from the bed.

3. The method according to claim 2, further comprising the step of:
   (k) repeating steps (a)-(j).

4. The method according to claim 2, wherein step (e) comprises harvesting a first number of breaks of mushrooms.

5. The method according to claim 4, wherein step (i) comprises harvesting a second number of breaks of mushrooms, less than the first number of breaks.

6. The method according to claim 5, wherein the first number is three.

7. The method according to claim 2, wherein step (g) comprises re-using the polymer sheet.

8. The method according to claim 1, wherein step (b) comprises laying the polymer sheet wherein the polymer sheet comprises woven polypropylene yarns.

9. The method according to claim 1, wherein step (b) comprises laying the polymer sheet wherein the polymer sheet has a plurality of perforations formed therein.

10. The method according to claim 1, wherein step (f) comprise removing the polymer sheet and the layer of peat simultaneously.

11. The method according to claim 1, wherein step (f) comprises removing the polymer sheet with the layer of peat on top of the polymer sheet.

* * * * *